(12) United States Patent
Boek et al.

(10) Patent No.: US 7,265,070 B2
(45) Date of Patent: Sep. 4, 2007

(54) SYNTHETIC SILICA GLASS OPTICAL MATERIAL HAVING HIGH RESISTANCE TO OPTICALLY INDUCED INDEX CHANGE

(75) Inventors: Heather D Boek, Corning, NY (US); Christine E Heckle, Horseheads, NY (US); Johannes Moll, Corning, NY (US); Charlene M Smith, Corning, NY (US)

(73) Assignee: Corning Incorporated, Corning, NY (US)

(*) Notice: Subject to any disclaimer, the term of this patent is extended or adjusted under 35 U.S.C. 154(b) by 305 days.

(21) Appl. No.: 10/996,507

(22) Filed: Nov. 24, 2004

(65) Prior Publication Data

US 2005/0112380 A1    May 26, 2005

Related U.S. Application Data

(60) Provisional application No. 60/525,419, filed on Nov. 26, 2003.

(51) Int. Cl.
*C03C 3/06* (2006.01)
*C03C 3/076* (2006.01)

(52) U.S. Cl. .................... 501/54; 501/53; 501/68; 428/426

(58) Field of Classification Search .......... 501/53, 501/54, 68; 428/426, 432, 446, 433
See application file for complete search history.

(56) References Cited

U.S. PATENT DOCUMENTS

| | | | | |
|---|---|---|---|---|
| 5,086,352 A | * | 2/1992 | Yamagata et al. | 359/350 |
| 5,983,673 A | * | 11/1999 | Urano et al. | 65/30.1 |
| 6,174,830 B1 | * | 1/2001 | Jinbo et al. | 501/54 |
| 6,333,283 B1 | * | 12/2001 | Urano et al. | 501/54 |
| 6,339,033 B2 | * | 1/2002 | Jinbo et al. | 501/54 |
| 6,587,181 B2 | * | 7/2003 | Jinbo et al. | 355/67 |
| 6,630,418 B2 | * | 10/2003 | Sempolinski | 501/54 |
| 6,689,706 B2 | * | 2/2004 | Sempolinski | 501/54 |
| 6,709,997 B2 | * | 3/2004 | Urano et al. | 501/37 |
| 6,920,766 B2 | * | 7/2005 | Coriand et al. | 65/531 |
| 2002/0144517 A1 | * | 10/2002 | Fujiwara et al. | 65/17.4 |
| 2003/0051507 A1 | * | 3/2003 | Ikuta et al. | 65/30.1 |
| 2003/0119650 A1 | * | 6/2003 | Sempolinski | 501/54 |
| 2005/0187092 A1 | * | 8/2005 | Bookbinder et al. | 501/54 |

OTHER PUBLICATIONS

V. Liberman, M. Rothschild, J.H.C. Sedlacek, R.S. Uttaro, A. Grenville, "Excimer-laser-induced densification of fused silica: laser-fluence and material-grade effects on the scaling law." Journal of Non-Crystalline Solids 244 (1999) 159-171. no month.

* cited by examiner

*Primary Examiner*—Anthony J. Green
(74) *Attorney, Agent, or Firm*—Timothy M. Schaeberle; Robert P. Santandrea

(57) ABSTRACT

Disclosed is a synthetic silica glass optical material having high resistance to optical damage by ultraviolet radiation in the ultraviolet wavelength range, particularly in the wavelength region of less than about 250 nm and particularly, exhibiting a low laser induced density change. The synthetic silica glass optical material of the present invention contains at least about 0.1 ppm of aluminum and $H_2$ concentration levels greater than about $0.5 \times 10^{17}$ molecules/cm$^2$. Additionally, the synthetic silica optical material of the present invention exhibits an $H_2$ to Al ratio of greater than about 1.2, as measured in $\times 10^{17}/cm^3$ molecules $H_2$ per ppm Al.

6 Claims, 3 Drawing Sheets

SYNTHETIC SILICA GLASS OPTICAL MATERIAL HAVING HIGH RESISTANCE TO OPTICALLY INDUCED INDEX CHANGE

CROSS-REFERENCE TO RELATED APPLICATION

The present application claims the benefit of U.S. Provisional Application Ser. No. 60/525,419 filed on Nov. 26, 2003, which is hereby incorporated by reference. Applicant claims the benefit of priority under 35 U.S.C. § 120 of the above-referenced application.

FIELD OF THE INVENTION

This invention relates to synthetic or fused silica optical materials and optical members. More particularly, the invention relates to synthetic or fused silica optical materials and optical members exhibiting improved laser-induced density or index change.

BACKGROUND OF THE INVENTION

As practiced commercially, fused silica optical members such as lenses, prisms, filters, photomasks, reflectors, etalon plates and windows, are typically manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, utilizing manufacturing steps that may include, but are not limited to, cutting, polishing, and/or coating pieces of glass from a blank. These optical members are used in various apparatus employed in environments where they are exposed to high-power ultraviolet light having a wavelength of about 360 nm or less, for example, an excimer laser beam or some other high-power ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

In overview, boules are manufactured by reacting silicon-containing gas molecules in a flame to form silica soot particles. The soot particles are deposited on the hot surface of a rotating or oscillating body where they consolidate to the glassy solid state. In the art, glass making procedures of this type are known as vapor phase hydrolysis/oxidation processes, or simply as flame deposition processes. The term "boule" is used herein with the understanding that the term "boule" includes any silica-containing body formed by a flame deposition process. Multiple blanks are cut from such boules and used to make the various optical members referred to above.

As the energy and pulse rate of lasers increase, the optical members which are used in conjunction with such lasers, are exposed to increased levels of laser radiation. Fused silica members have become widely used as the manufacturing material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength excimer lasers operating in the UV and deep UV (DUV) wavelength ranges, which includes lasers operating at about 248 nm and 193 nm wavelengths, respectively. Excimer laser systems are popular in microlithography applications, and the shortened wavelengths allow for increased line densities in the manufacturing of integrated circuits and microchips, which enables the manufacture of circuits having decreased feature sizes. A direct physical consequence of shorter wavelengths (higher frequencies) is higher photon energies in the beam due to the fact that each individual photon is of higher energy. In such excimer laser systems, fused silica optics are exposed to high energy photon irradiation levels for prolonged periods of time resulting in the degradation of the optical properties of the optical members.

It is known that laser-induced degradation adversely affects the performance of fused silica optical members by decreasing light transmission levels, altering the index of refraction, altering the density, and increasing absorption levels of the glass. Specifically, the two main types of laser-induced degradation that can occur are induced absorption and induced index change as a result of density change.

Given the semiconductor industry reliance on excimer lasers and materials that transmit that energy to make integrated circuit chips and other products and the constant drive towards decreased line width and the necessary wavelength of the incident light and the resultant increase in the laser energy level, it follows that the fused silica material requirements have become much more stringent. The new generation material must be as inert as possible with respect to the incident energy. Many other researchers have tried to make a material that does not interact with the light, however they have been unsuccessful. Accordingly, it would be desirable and is an objective of the present invention to provide fused silica glass articles that exhibited improved resistance to laser induced index/density change.

SUMMARY OF THE INVENTION

The invention relates to synthetic or fused silica glass optical materials. As used herein, the term "synthetic or fused silica glass optical material" includes the boule or the bulk piece of fused silica produced in a furnace, blanks cut from a boule, and fused silica optical members manufactured from blanks of synthetic fused silica. The production of fused silica optical members may involve finishing steps including, but not limited to cutting, grinding, polishing and/or coating the piece of fused silica glass.

According to one embodiment of the present invention, synthetic silica glass optical materials are provided having high resistance to optical damage by ultraviolet radiation in the ultraviolet wavelength range, particularly in the wavelength less than about 250 nm and particularly, exhibiting a low laser induced density change.

In one embodiment of the invention, the synthetic silica glass optical material of the present invention contains at least about 100 ppb (0.1 ppm) of aluminum and $H_2$ concentration levels greater than about $0.5 \times 10^{17}$ molecules/$cm^3$. Additionally, the synthetic silica optical material of the present invention exhibits an $H_2$ to Al ratio greater than about 1.2 ($\times 10^{17}$ molecules/$cm^3 H_2$ per ppm Al). According to another embodiment, the amount of aluminum present in the synthetic silica optical material ranges between about 100 and 1200 ppb (or 0.1 to 1.2 ppm) while the $H_2$ concentration ranges from 0.5 to $5 \times 10^{17}$ molecules/$cm^3$. In a preferred embodiment, the synthetic silica optical material exhibits an $H_2$ to Al ratio ranging between about 1.2 to 3.5.

The synthetic silica glass optical material of the present invention enables the production of lens systems for use in photolithographic equipment exhibiting reduced levels of induced density change within the fused or synthetic silica glass lenses incorporated in the lens systems.

Additional advantages of the invention will be set forth in the following detailed description. It is to be understood that both the foregoing general description and the following detailed description are exemplary and are intended to provide further explanation of the invention as claimed.

DETAILED BRIEF DESCRIPTION OF THE INVENTION

Figure 1:
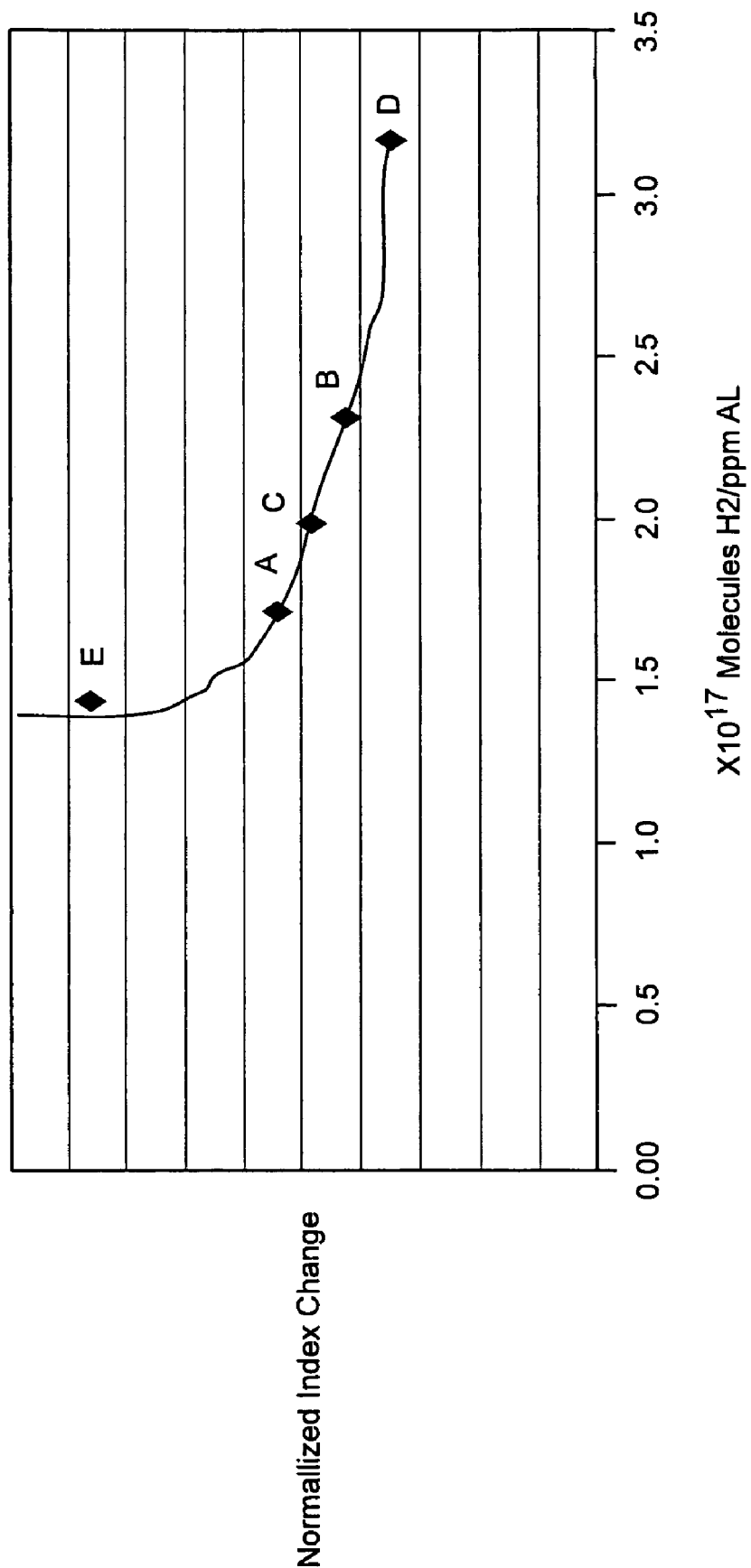
FIG. 1 is a graph illustrating the dependence of index change on the $H_2$ to Al ratio.

It is well known in the art that synthetic fused silica is subject to the phenomenon of "compaction" which occurs during or after exposure to laser light of high energy density. This effect leads to a local increase in density and an ensuing increase in refractive index which in turn causes deterioration of the optical properties of the optical component. Additionally, it is also known that the opposite effect may also occur, i.e. when an optical quartz glass component is exposed to laser light of low energy density but high pulse number, expansion has been observed which in turn is accompanied by an ensuing decrease in refractive index. It follows that this effect also causes the optical properties to deteriorate. Thus, compaction and expansion are defects that do not necessarily cause an increase in radiation-induced absorption, but rather may limit the serviceable life of an optical component.

The present invention provides a synthetic silica glass optical material for transmission of ultraviolet radiation of a wavelength of 250 nm or shorter that exhibits a low degree of induced absorption and is optimized with respect to its compaction and expansion properties. The synthetic silica glass optical material of the present invention is made from ultra-high purity synthetic silica glass and possesses the following composition which is tailored to exhibit the aforementioned optimized compaction/expansion property; specifically low induced density or index change. Particularly, the inventive synthetic silica glass optical material composition comprises an aluminum concentration greater that about 100 ppb (0.1 ppm) and a $H_2$ concentration level greater than about $0.5 \times 10^{17}$ molecules/cm³. Furthermore, the synthetic silica glass optical material exhibits a particular $H_2$ to aluminum ratio greater than about 1.2, as measured in $\times 10^{17}$ molecules/cm³ $H_2$ per ppm Al.

While not intending to be limited by theory, Applicant's believe that that the composition's narrow $H_2$/Al ratio greatly contributes to this improved/reduced index change. Induced index change in fused silica is a result of induced density change. In prior art glasses, the incident light attacks weak bonds due to metallic impurities, other bond terminators or strained bonds. The structure rearranges as a result of this attack and causes the induced density/index change. In order to minimize index change, the glass structure should be as strong as possible and not subject to attack. The presence of molecular hydrogen is both desirable and undesirable as it functions to minimize induced absorption, however the presence of molecular hydrogen leads to the presence of the hydride species in the fused silica matrix which causes the undesirable laser induced expansion. Based on this assumption, the inventors theorized that the presence of Al, which has a compaction effect, would counteract the expansion effect of the hydride species. In other words, the hydride "expansion" species counterbalanced by the presence of an amount of the Al "compaction" species; i.e., the Al-molecules compensate for the deficiencies of the hydride species.

Regarding particularly the aluminum concentration, there are no absolute limits on the amount which can be included, however, Al amounts greater than about 5000 ppb (5 ppm) are undesirable as the presence of this much aluminum detrimentally affects other glass properties such as transmission, glass viscosity behavior and index homogeneity. According to one embodiment of the present invention, aluminum is typically present in an amount exceeding the normal impurity level, while the other metals impurities are maintained at prior art lower (less than 10 ppb) levels. In one embodiment, as mentioned above the amount of aluminum in the synthetic silica optical material is greater than about 100 ppb (0.1 ppm). In a preferred embodiment, the aluminum present in the synthetic silica optical material ranges between about 100 to 1200 ppb (0.1 to 1.2 ppm). In a highly preferred embodiment, the amount of aluminum is between about 200 ppb and 600 ppb (0.2 to 0.6 ppm).

The presence of aluminum acts in several ways to strengthen the glass matrix. It minimizes bond terminators by tying up loose alkali ions through charge balance, acts as network former in the matrix, and inhibits or counteracts the formation of a hydride species usually found in fused silica. As previously mentioned, it is the last effect the inhibiting or the counteracting of the formation hydride species that has the greatest impact on the reduction in the laser induced density change of the present inventive synthetic silica optical material.

In spite of the presence of the undesirable hydride species which are inherently dependent on the concentration of the $H_2$ molecule concentration, it is necessary that a certain minimum amount $H_2$ is present in the silica glass composition. It is the presence of $H_2$ molecules in an amount greater than $0.5 \times 10^{17}$ molecules/cm³ that ensures that there is a minimization of induced absorption which in turn ensures that the transmission of the synthetic silica glass is acceptable. On the other hand, $H_2$ molecules in an amount of greater than $5 \times 10^{17}$ molecules/cm³ results in unacceptable induced density change/expansion that can not be sufficiently inhibited or counteracted by the presence of the Al species.

As previously mentioned the hydride species is dependent on the hydrogen concentration in the glass as a result of the forming process. An increase in hydrogen leads to an increase in the hydride species and a resultant increase in the tendency to exhibit a decreased density/index change (or expansion) under exposure. The aluminum serves to inhibit or counteract the formation of the hydride species that causes the induced index change/decrease. If the aluminum concentration is too little, the hydride will form. If the concentration becomes too great, then the aluminum can become a source of strained bonds. If there is too little molecular hydrogen in the glass, then the other laser damage property, induced absorption, becomes a problem. The inventive balance between the aluminum and the as-made hydrogen concentration leads to a synthetic silica optical material that has very little induced density change and minimal induced absorption. In a preferred embodiment the composition of the inventive synthetic silica material is such that the ratio of $H_2$ to Al exceeds about 1.2, as measured in molecules/$cm^3 H_2$ Al per ppm Al. In a more preferred embodiment, the $H_2$ to Al ratio ranges between about 1.2 to 3.5, and more preferably 1.7 to 3.5. While in the most preferred embodiment the synthetic silica glass optical material of the present invention exhibits an $H_2$ to Al ratio of 1.7, as measured in molecules/$cm^3 H_2$ Al per ppm Al. Synthetic silica glass optical materials having compositions within these $H_2$ to Al ratio ranges exhibit sufficiently low induced density change, over a wide range of incident energy levels.

The aforementioned synthetic silica glass optical material according to the present invention can be produced by the following direct deposition method. Specifically the synthetic silica glass optical material is formed by:

a) producing a gas stream containing a silicon-containing compound in vapor form capable of being converted through thermal decomposition with oxidation or flame hydrolysis to silica;

b) introducing a metal aluminum dopant into the gas stream;

c) passing the gas stream into the flame of a combustion burner to form amorphous particles of metal-doped fused silica;

d) depositing the amorphous particles onto a support; and e) consolidating the deposit of amorphous particles into a transparent glass body.

Useful silicon-containing compounds for forming the glass body preferably include any halide-free cyclosiloxane compound, for example, polymethylsiloxane such as hexamethyldisiloxane, polymethylcyclosiloxane, and mixtures of these. Examples of particularly useful polymethylcyclosiloxanes include octamethylcyclotetrasiloxane, decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula —[SiO(CH$_3$)$_2$]$_4$—, is used as the feedstock for the fused silica boule process, or in the vapor deposition processes such as used in making high purity fused silica for optical waveguide applications.

In one particular embodiment of the invention, aluminum is added to fused silica glass articles to improve internal transmission and decrease the absorption change in the glass. A particularly preferred precursor for adding aluminum to fused silica glass articles is aluminum acetylacetonate. Aluminum acetylacetonate and OMCTS are chemically compatible, and they do not react prematurely when gas streams containing both materials are mixed. In addition, the vaporization characteristics of aluminum acetylacetonate are compatible with existing OMCTS vapor delivery systems. For example, aluminum acetylacetonate does not decompose at temperatures required to deliver OMCTS to a burner for conversion to silica soot, and the hydrogen concentration is controlled through the redox condition of the flame during hydrolysis.

EXAMPLES

Referring to FIG. 1 illustrated is graph showing the relationship between $H_2$:Al ratio and a normalized index change as a measure of density change; normalized index change being index change divided by the fluence of the test. The curve shown is based on damage measurements performed on a series of inventive, synthetic silica glass examples exhibiting differing $H_2$ and Al concentrations and thus differing $H_2$/Al concentrations; Table I reports the Examples A-E, the $H_2$ concentration ($\times 10^{17}$ molecules/$cm^3$), the Al concentration (ppm) and the $H_2$ to Al ratio (as measured in $10^{17}$ molecules $H_2$/$cm^3$ per ppm Al). The exposures are performed with laser light of a wavelength of 193 nm and a laser pulse length between 15 and 50 nanoseconds. The laser pulse length is determined according to the method described by V. Liberman, M. Rothschild, J. H. C. Sedlacek, R. S. Uttaro, A. Grenville in "Excimer-laser-induced densification of fused silica: laser-fluence and material-grade effects on scaling law", Journal Non-Cryst. Solids 244 (1999), p. 159-171.

TABLE I

| Sample | $H_2$ | Al | $H_2$/Al |
|---|---|---|---|
| A | 1.86 | 1.1 | 1.69 |
| B | 1.05 | 0.5 | 2.1 |
| C | 0.96 | 0.5 | 1.92 |
| D | 1.5 | 0.5 | 3.0 |
| E | 1.5 | 1.1 | 1.36 |

An examination of FIG. 1 reveals the dependence of index change on the $H_2$ to aluminum ratio. Additionally, FIG. 1 shows that at low ratios (below about 1.2), the index change is undesirably very steep over a short compositional range and is likely too compacting due to the high amount of aluminum versus the $H_2$ concentration. At higher ratios, above 1.2 the index change is much shallower, indicating a more useful compositional range, and thus a compositional region that is more stable for the excimer laser lens application.

Table II lists three additional comparison prior art synthetic silica optical materials each having less then 10 ppb (0.01 ppm) aluminum, the amount currently detectable by state of the art detection techniques, and thus an undesirable $H_2$ to Al ratio. Each of these comparison samples were made by the direct deposition method as detailed above.

TABLE II

| Sample | $H_2$ ($\times 10^{17}$ molecules/$cm^3$) |
|---|---|
| F | 1.4 |
| G | 1.05 |
| H | 0.96 |

Figure 2:
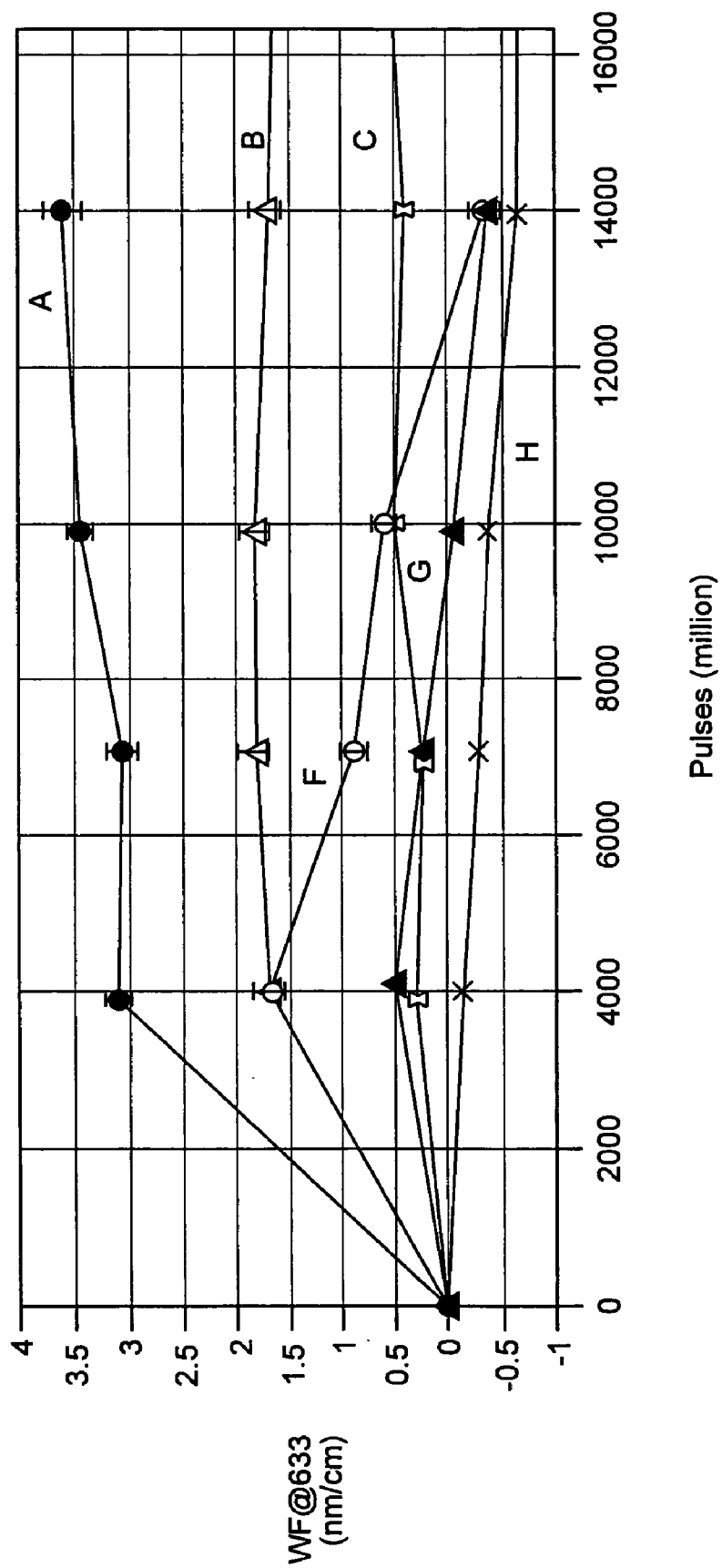
FIG. 2 is a graph illustrating wavefront distortion vs. fluence relationship for prior art synthetic silica optical materials and the inventive synthetic silica optical materials exhibiting the inventive $H_2$ to Al ratio.

Referring now to FIG. 2 is an illustration of the occurrence of compaction and expansion as a function of pulse number (X-axis denoted "pulses" in the Figure) for the Samples A-C detailed above in Table I and Comparison Samples F-H of Table II; i.e., FIG. 2 illustrates the wavefront distortion vs. fluence behavior for a number of inventive and comparison synthetic silica optical materials. Samples A and F were measured at a constant pulse energy density of approximately 200 µJ/$cm^2$, Samples B and G at a constant pulse energy density approximately 122 µJ/$cm^2$ and Samples C and H at a constant pulse energy density approximately 40 µJ/$cm^2$. The Y-axis shows the wavefront distortion in nm/cm of the incident light of a wavelength of 633 nm in this particular example. The wavefront distortion is a result of the incident, level wavefront being disturbed by spatial inhomogeneities of the refractive index. Thus, the wavefront distortion is a measure of the occurrence of compaction or expansion.

An examination of in FIG. 2 reveals the Sample A synthetic silica optical material having an $H_2$/Al ratio of 1.69, particularly an $H_2$-content of $1.86 \times 10^{17}$ molecules/cm$^3$ and an Al content of 1.1 ppm, exhibits a reasonably low sloped compaction behavior after about 4 billion pulses. As a comparison, the Sample F synthetic silica optical material, having an $H_2$-content of $1.4 \times 10^{17}$ molecules/cm$^3$ and an less than 10 ppb (0.01 ppm) Al content, exhibits a much more sloped compaction behavior that changes to expansion after about 12 billion pulses.

Referring now to Samples B and G, FIG. 2 reveals that the Sample B material ($H_2$/Al ratio of 2.1), again exhibits a reasonably low sloped compaction behavior after about 4 billion pulses, while the comparison Sample G silica material ($H_2$-content of $1.05 \times 10^{17}$ molecules/cm$^3$ and no measurable Al), although initially exhibiting a reasonably sloped compaction behavior prior, has a behavior that changes to expansion after 9.5 billion pulses; this mixed compaction/expansion behavior being undesirable.

Referring now to Samples C and H, FIG. 2 reveals that the Sample C material ($H_2$/Al ratio of 1.92), exhibits, throughout the laser damage/pulse testing, a reasonably low sloped compaction behavior, while the comparison Sample H silica material ($H_2$-content of $0.96 \times 10^{17}$ molecules/cm$^3$ and no measurable Al), though exhibiting a reasonably sloped behavior, the behavior phenomenon is undesirably that of expansion.

In short, the inventive samples A-C, illustrate a relatively narrow hydrogen to alumina ratio which results in synthetic silica optical materials which exhibit a reduced wavefront distortion, and specifically a lowered compaction (or non-expanding) behavior when compared to comparison prior art synthetic silica materials articles not exhibiting this required and inventive $H_2$ to alumina ratio; i.e. the inventive glass gets denser over time as a result of laser damage/pulses whereas the prior comparison glass gets less dense over time. As noted above, all of comparison samples exhibited either mixed expansion and compaction behavior, or simply expansion behavior, over time.

Table III lists two additional comparison prior art synthetic silica optical materials, Examples I and J, each having an undesirable $H_2$ to Al ratio outside the scope of the instant invention; 7.14 and 0.95 respectively. Each of these comparison samples were made by the direct deposition method as detailed above.

TABLE III

| Sample | $H_2$ ($\times 10^{17}$ molecules/cm$^3$) | Al (ppm) | $H_2$/Al |
|---|---|---|---|
| I | 1.4 | 0.14 | 7.1 |
| J | 1.0 | 1.05 | 0.95 |

Figure 3:
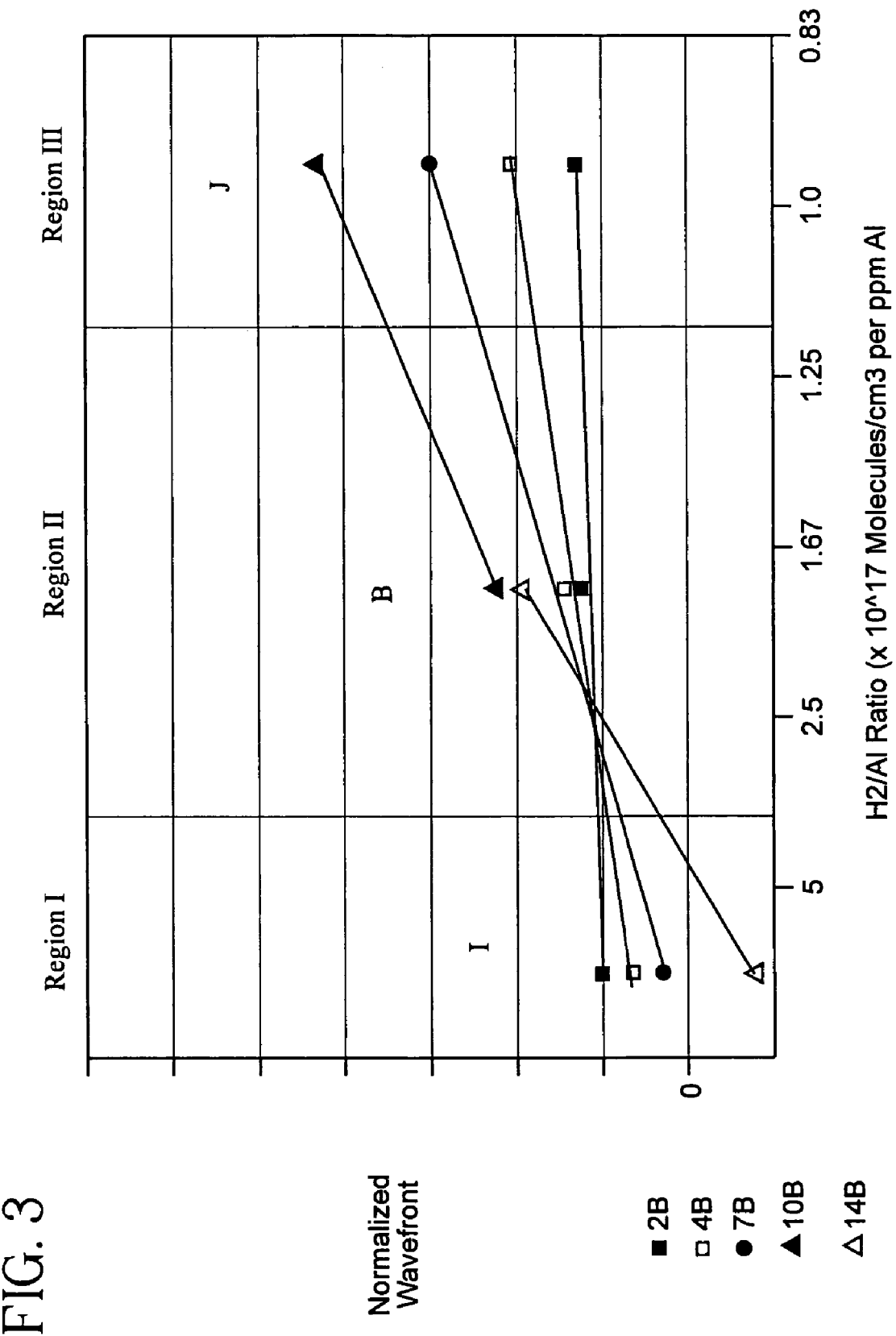
FIG. 3 is a graph illustrating normalized wavefront distortion (for various laser pulse counts/exposures) vs. $H_2$ to Al ratio for two prior art synthetic silica optical materials and an inventive synthetic silica optical material exhibiting the inventive $H_2$ to Al ratio.

Referring now to FIG. 3 is graph illustrating the relationship of normalized wavefront distortion (for various/increasing laser pulse counts/exposures) vs. $H_2$ to Al ratio for comparison samples I and J, as well as inventive example B. As described above, the normalized index change being a measure of the index change divided by the fluence of the test. Each of the samples tested were exposed to a laser light exhibiting a wavelength of 193 nm and a laser pulse length between 15 and 50 nanoseconds; the actual wavefront was then measured using a 633 nm interferometer. The laser pulse length is determined according to the method described by V. Liberman, M. Rothschild, J. H. C. Sedlacek, R. S. Uttaro, A. Grenville in "Excimer-laser-induced densification of fused silica: laser-fluence and material-grade effects on scaling law", Journal Non-Cryst. Solids 244 (1999), p. 159-171. Each of the samples normalized wavefront value (or index change) was measured at a variety of increasing pulse counts; specifically 2 billion (2B), 4 billion (4B), 7 billion (7B), 10 billion (10B) and 14 billion (14B).

An examination of FIG. 3 reveals the dependence of index change on the $H_2$ to aluminum ratio like that shown in FIG. 1. It is clear that in Region I, comparison sample I begins compacting and then moves towards expansion as the number of pulses increase, indicating that the ratio of $H_2$ to Al (7.1) is too high. Comparison sample J, in falling in Region III, begins compacting and continues compacting, to an unacceptable high value, indicating that the ratio (0.95) is too low. Contrast the comparison samples with inventive sample B located in Region II ($H_2$ to Al ratio of 2.1); this sample's behavior, when exposed to increasing pulse counts is such that the index change remains low and does not turn towards expansion.

Advantages of the inventive synthetic silica optical materials as compared to prior art synthetic silica optical materials include the following: (1) a consistent low fluence behavior (i.e., no mixed compaction/expansion), which is desired in fused silica lenses, which in turn leads to improved lens behavior/performance; (2) avoidance of stress buildup in the lenses and the resultant detrimental effect on imaging or lithography operations that may occur in those synthetic silica optical lenses which are subject to inconsistent induced index/density changes as a result of mixed compaction/expansion behavior; and, (3) synthetic silica optical materials, like the inventive materials, which exhibit consistent laser induced behavior (index/density change) result in easier system designs for lens designers as a result of not having to compensate for the above mixed expansion/compaction behavior.

It will be apparent to those skilled in the art that various modifications can be made to the present invention without departing from the spirit or scope of the invention. Thus, it is intended that the present invention covers modifications and variations of this invention provided they come within the scope of the appended claims and their equivalents.

What is claimed is:

1. A synthetic silica glass optical material for use, and resistant to optical damage, in the wavelength region of less than 250 nm, the synthetic silica glass optical material containing aluminum concentration in an amount greater than 0.1 ppm, containing $H_2$ concentration levels greater than about $0.5 \times 10^7$ molecules/cm$^3$, exhibiting an $H_2$ to Al ratio that ranges between about 1.2 to 3.5, as measured in $10^{17}$/cm$^3$ $H_2$ per ppm Al, and exhibiting a low induced density change, as evidenced by a wave front distortion greater than zero, wherein a variation in wavefront distortion is less than about 0.5 nm/cm when exposed to at least 4 billion pulses of incident 633 nm light having a pulse energy in a range from about 40 µJ/cm$^2$ to about 200 µJ/cm$^2$.

2. The synthetic silica glass optical material of claim 1, wherein the aluminum concentration ranges between about 0.1 and 1.2 ppm.

3. The synthetic silica glass optical material of claim 1, wherein the aluminum concentration article ranges between about 0.2 and 0.6 ppm.

4. The synthetic silica glass optical material of claim 1, wherein the $H_2$ concentration ranges from about 0.5 to $5 \times 10^{17}$ molecules/cm$^3$.

5. The synthetic silica glass optical material of claim 1, wherein the $H_2$ to Al ratio ranges between about 1.7 to 2.8, as measured in $10^{17}$ molecules $H_2$/cm$^3$ per ppm Al.

6. The synthetic silica glass optical material of claim 1, wherein the article exhibits an $H_2$ to Al ratio of 1.7, as measured in $10^{17}$ molecules $H_2$/cm$^3$ per ppm Al.

* * * * *

UNITED STATES PATENT AND TRADEMARK OFFICE
CERTIFICATE OF CORRECTION

PATENT NO. : 7,265,070 B2
APPLICATION NO. : 10/996507
DATED : September 4, 2007
INVENTOR(S) : Heather Debra Boek et al.

It is certified that error appears in the above-identified patent and that said Letters Patent is hereby corrected as shown below:

Col. 8  Line 54  Reads "than about $0.5 \times 10^7$ molecules/cm$^3$,…" should read
        Claim 1  --than about $0.5 \times 10^{17}$ molecules/cm$^3$,…--

Col. 8  Line 58  Reads "greater than zero, wherein a variation in wavefront…"
        claim 1  should read --greater then zero, wherein the variation in wavefront…--

Signed and Sealed this

Fourth Day of December, 2007

JON W. DUDAS
*Director of the United States Patent and Trademark Office*